United States Patent
Baek et al.

(10) Patent No.: US 12,120,476 B2
(45) Date of Patent: Oct. 15, 2024

(54) ELECTRONIC DEVICE INCLUDING AUDIO OUTPUT MODULE

(71) Applicant: SAMSUNG ELECTRONICS CO., LTD., Suwon-si (KR)

(72) Inventors: Incheol Baek, Suwon-si (KR); Yonghwa Kim, Suwon-si (KR); Yongseung Yi, Suwon-si (KR); Jeonggyu Jo, Suwon-si (KR); Hoyeong Lim, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 35 days.

(21) Appl. No.: 17/841,438

(22) Filed: Jun. 15, 2022

(65) Prior Publication Data

US 2022/0386003 A1 Dec. 1, 2022

Related U.S. Application Data

(63) Continuation of application No. PCT/KR2022/006332, filed on May 3, 2022.

(30) Foreign Application Priority Data

May 28, 2021 (KR) .................. 10-2021-0069049

(51) Int. Cl.
*H04R 1/02* (2006.01)
*H04M 1/02* (2006.01)
(Continued)

(52) U.S. Cl.
CPC ............ *H04R 1/028* (2013.01); *H04M 1/026* (2013.01); *H04R 3/00* (2013.01); *H04R 7/12* (2013.01); *H04R 2499/11* (2013.01)

(58) Field of Classification Search
CPC . H04R 1/028; H04R 3/00; H04R 7/12; H04R 2499/11; H04M 1/026
(Continued)

(56) References Cited

U.S. PATENT DOCUMENTS

| 2013/0195311 A1 | 8/2013 | Sahyoun |
| 2017/0070811 A1 | 3/2017 | Mihelich et al. |
| 2018/0242060 A1 | 8/2018 | Ji et al. |

FOREIGN PATENT DOCUMENTS

| KR | 2003-0014819 | 2/2003 |
| KR | 10-0860679 | 9/2008 |

(Continued)

OTHER PUBLICATIONS

International Search Report for PCT/KR2022/006332 dated Aug. 1, 2022, 3 pages.

(Continued)

*Primary Examiner* — Ammar T Hamid
(74) *Attorney, Agent, or Firm* — NIXON & VANDERHYE P.C.

(57) ABSTRACT

Disclosed is an electronic device including a sound output module. The sound output module includes a sound output housing and a motor unit positioned in an inner space and communicating with an inner space of the speaker unit to generate a vibration force. The motor unit may include a motor body forming a volume space communicating with the inner space of the speaker unit and a vibration body positioned in the motor body to generate a vibration force. A communication hole may be formed in an outer wall of the motor body for the inner space of the speaker unit and the volume space to communicate with each other.

20 Claims, 9 Drawing Sheets

(51) Int. Cl.
*H04R 3/00* (2006.01)
*H04R 7/12* (2006.01)

(58) Field of Classification Search
USPC .................................................. 381/334, 332
See application file for complete search history.

(56) References Cited

FOREIGN PATENT DOCUMENTS

| KR | 10-0890393 | 3/2009 | | |
|---|---|---|---|---|
| KR | 10-1783417 | 9/2017 | | |
| KR | 10-2018-0085506 | 7/2018 | | |
| KR | 10-2020-0047158 | 5/2020 | | |
| KR | 10-2020-0074697 | 6/2020 | | |
| KR | 20200074697 A | * | 6/2020 | ............. H04R 9/025 |
| KR | 10-2020-0104315 | 9/2020 | | |

OTHER PUBLICATIONS

Extended European Search Report for EP Application No. 22811509.3 dated Sep. 3, 2024, 39 pages.

* cited by examiner

ELECTRONIC DEVICE INCLUDING AUDIO OUTPUT MODULE

CROSS-REFERENCE TO RELATED APPLICATIONS

This application is a continuation of International Application No. PCT/KR2022/006332 designating the United States, filed on May 3, 2022, in the Korean Intellectual Property Receiving Office and claiming priority to Korean Patent Application No. 10-2021-0069049, filed on May 28, 2021, in the Korean Intellectual Property Office, the disclosures of which are incorporated by reference herein in their entireties.

BACKGROUND

1. Field

The disclosure relates to an electronic device including an audio output module.

2. Description of Related Art

Portable electronic devices have been reduced in size and weight in order to increase a user's portability. Generally, a sound output module is installed in a portable electronic device, and by improving a structure of the sound output module, the size and weight of the electronic device may be reduced. In case of the sound output module, a back volume may be formed to improve sound quality. An actual back volume through structural characteristics of a speaker and a motor may be improved such that the size and weight of the sound output module is reduced. Thus, there is a need to develop a sound output module having improved structural characteristics of a speaker and a motor for increasing an actual back volume by improving an internal space.

SUMMARY

According to example embodiments, a speaker unit and a motor unit may be separately mounted inside a housing, and the motor unit may be disposed outside of the speaker unit.

Thus, a space occupied by the speaker unit may be reduced as much as a space occupied by the motor unit in the housing.

Embodiments of the disclosure provide an electronic device including a sound output module.

According to various example embodiments, it is possible to increase an actual back volume of a sound output module.

According to various example embodiments, it is possible to reduce a size and weight by simply designing an inner space.

According to an example embodiment, an electronic device includes a sound processor configured to process a sound signal and a sound output module configured to output sound based on the sound signal of the sound processor, the sound output module may include a sound output housing, a speaker unit comprising a speaker positioned in the sound output housing configured to generate sound, and a motor unit comprising a motor configured to communicate with an inner space of the speaker unit to generate a vibration force. The motor unit may include a motor body forming a volume space communicating with the inner space of the speaker unit and a vibration body positioned in the motor body to generate a vibration force. A communication hole may be formed in an outer wall of the motor body for the inner space of the speaker unit and the volume space to communicate with each other.

According to an example embodiment, the speaker unit may include a speaker body connected to an inner surface of the sound output housing and a diaphragm configured to vibrate by the vibration force of the motor unit and positioned in the speaker body.

According to an example embodiment, an inner space of the speaker body may be divided into a first space and a second space based on the diaphragm. The second space may communicate with the volume space through the communication hole. The first space and the second space may be blocked from each other by the diaphragm.

According to an example embodiment, the motor unit may further include an elastic member comprising an elastic material positioned on both sides of the vibration body configured to transmit the vibration force of the vibration body. A vibration direction of the vibration body may be perpendicular to a direction from the motor unit toward the speaker unit.

According to an example embodiment, the sound output module may further include a circuit board configured to receive an operation signal of the speaker unit. The circuit board may be connected to the elastic member to receive an operation signal of the motor unit.

According to an example embodiment, the speaker unit may be connected to one wall of the sound output housing. The one wall of the sound output housing connected to the speaker unit may extend toward the motor unit. The motor unit may be connected to the one wall of the sound output housing to which the speaker unit is connected. A heat generated by the speaker unit may be radiated through the one wall of the sound output housing to which the speaker unit and the motor unit are connected.

According to various example embodiments, a motor unit may be positioned in an inner space of a housing used as a back volume of a speaker unit, and an inner space of the motor unit may communicate with the back volume of the speaker unit. Thus, an actual back volume of a sound output module may be increased, which may further improve sound quality.

According to various example embodiments, a fixed structure of a horizontal vibration motor unit and a speaker unit may be integrally formed with each other such that an inner space of the housing may be effectively occupied, and thus a size and weight of the motor unit and the speaker unit may be reduced.

BRIEF DESCRIPTION OF THE DRAWINGS

The above and other aspects, features, and advantages of certain embodiments of the present disclosure will be more apparent from the following detailed description, taken in conjunction with the accompanying drawings, in which.

DETAILED DESCRIPTION

Figure 1:
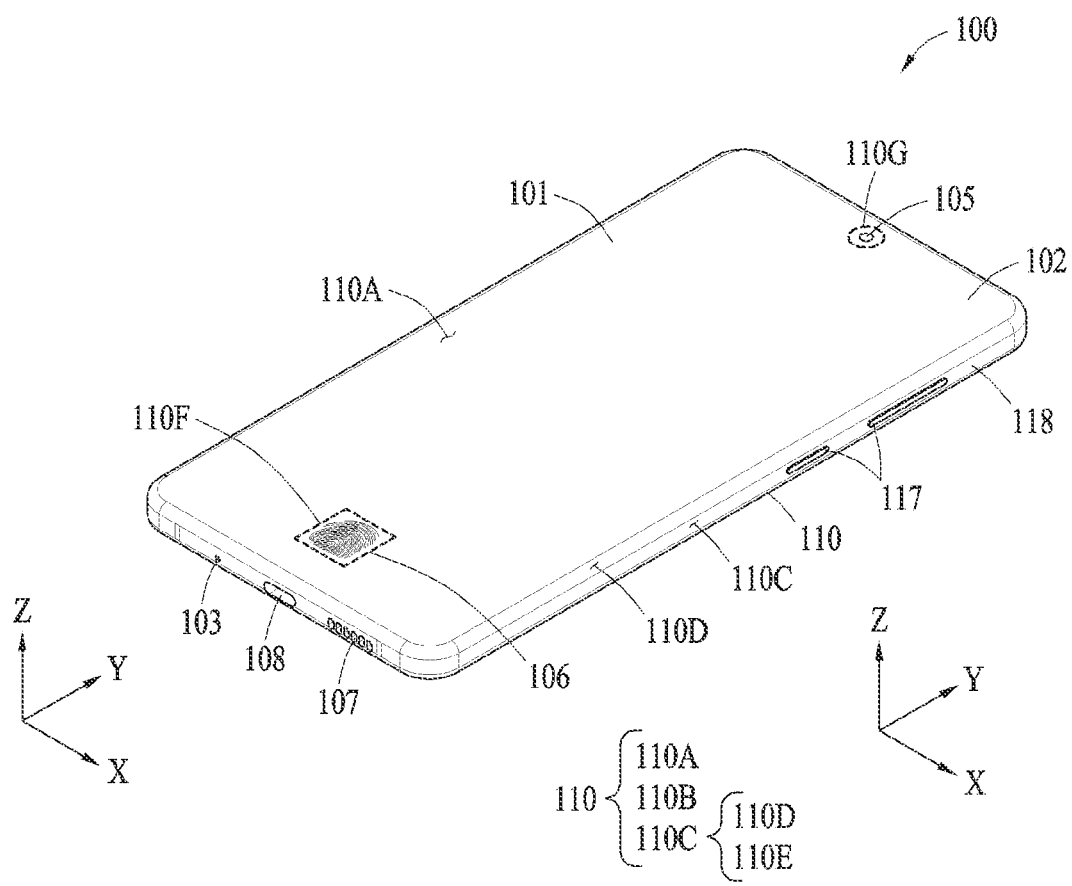
FIG. 1 is a front perspective view of an electronic device according to various embodiments.

Hereinafter, various example embodiments will be described in greater detail with reference to the accompanying drawings. When describing the example embodiments with reference to the accompanying drawings, like reference numerals refer to like elements and a repeated description related thereto may not be provided.

Figure 2:
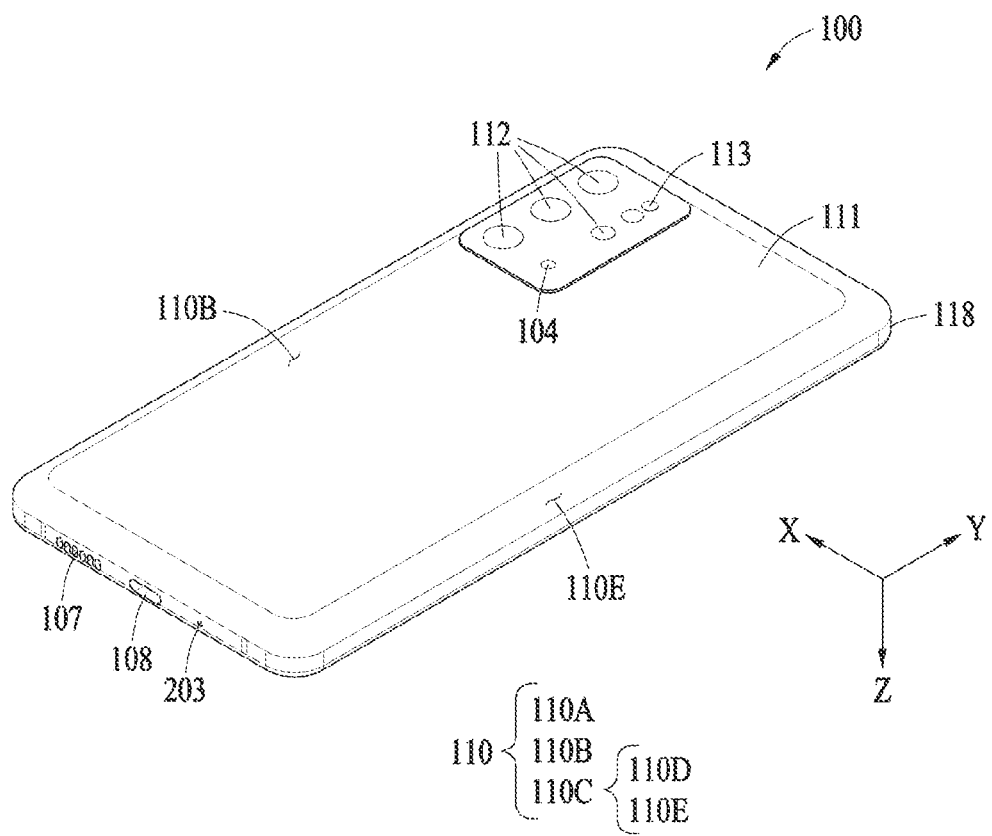
FIG. 2 is a rear perspective view of the electronic device according to various embodiments.

Referring to FIGS. 1 and 2, an electronic device 100 may include a first surface (or a front surface) 110A, a second surface (or a rear surface) 110B, and a housing 110 including a side surface 110C surrounding a space between the first surface 110A and the second surface 110B.

In an embodiment (not shown), the housing 110 may be a structure that forms a portion of the first surface 110A, the second surface 110B, and the side surface 110C.

In an embodiment, the first surface 110A may be formed by a front plate 102 (e.g., a front plate 120 in FIG. 3) of which at least a portion is substantially transparent. For example, the front plate 102 may include a glass plate including various coating layers or a polymer plate.

In an embodiment, the second surface 110B may be formed by a rear plate 111 (e.g., a rear plate 180 in FIG. 3) that is substantially in-transparent. The rear plate 111 may be formed by, for example, coated or tinted glass, ceramic, polymer, metal (e.g., aluminum, stainless steel (STS), or magnesium), or any combination of two or more of the above materials. The side surface 110C may be coupled to the front plate 102 and the rear plate 111 and may be formed by a side bezel structure 118 (e.g., a frame structure 141 in FIG. 3) including metal and/or polymer.

In an embodiment, the rear plate 111 and the side bezel structure 118 may be integrally formed with each other and may include the same material (e.g., a metal material such as aluminum).

In the illustrated embodiment, the front plate 102 may include two first areas 110D that are curved and extend seamlessly in a direction of the rear plate 111 from a partial area of the first surface 110A. The first areas 110D may be positioned at both ends of a long edge of the front plate 102.

In the illustrated embodiment, the rear plate 111 may include two second areas 110E that are curved and extend seamlessly in a direction of the front plate 102 from a partial area of the second surface 110B. The second areas 110E may be included at both ends of a long edge of the rear plate 111.

In an embodiment, the front plate 102 (or the rear plate 111) may include only one of the first areas 110D (or one of the second areas 110E). In an embodiment, the front plate 102 (or the rear plate 111) may not include a portion of the first areas 110D (or a portion of the second areas 110E).

In an embodiment, from a side view of the electronic device 100, the side bezel structure 118 may have a first thickness (or a width) in a side direction (e.g., a short side) not including the first areas 110D or the second areas 110E and may have a second thickness that is less than the first thickness in a side direction (e.g., a long side) including the first areas 110D and the second areas 110E. In some example embodiments, the side bezel structure 118 may be integrally formed with the rear plate 111.

In an embodiment, the electronic device 100 may include any one of a display 101 (e.g., a display 130 in FIG. 3), audio modules 103, 104, and 107, a sensor module (not shown), a second sensor module 106, camera modules 105 and 112, key input devices 117, a light-emitting diode (LED) (not shown), and a connector hole 108. In an embodiment, the electronic device 100 may not include any one of the components (e.g., the key input devices 117 or the LED (not shown)) or additionally include other components.

In an embodiment, the display 101 may be visible through any portion of the front plate 102. For example, any portion of the display 101 may be visible through the front plate 102 including the first surface 110A and the first areas 110D of the side surface 110C.

In an embodiment, a shape of the display 101 may be substantially the same as an adjacent outer shape of the front plate 102. In an embodiment (not shown), a distance between an outer periphery of the display 101 and an outer periphery of the front plate 102 may be substantially the same to expand an area to which the display 101 is exposed.

In an embodiment, a surface of the housing 110 (or the front plate 102) may include a screen display area in which the display 101 is visually exposed and content is displayed via pixels. For example, the screen display area may include the first surface 110A and the first areas 110D at the side.

In an embodiment (not shown), the display 101 may include a touch sensing circuit, a pressure sensor capable of measuring an intensity (pressure) of a touch, and/or a digitizer detecting a magnetic-field type stylus pen, or the display 101 may be disposed adjacent to the components described above.

In an embodiment, screen display areas (e.g., the first surface 110A and the first areas 110D at the side) may include a sensing area 110F and/or a camera area 110G.

In an embodiment, the sensing area 110F may be at least partially overlapped with the screen display areas (e.g., the first surface 110A and the first areas 110D at the side). The sensing area 110F may display content like other areas of the screen display areas (e.g., the first surface 110A and the first areas 110D at the side) and may additionally be an area through which an input signal related to the second sensor module 106 is transmitted therethrough.

In an embodiment, any portion of the second sensor module 106 may be disposed below the screen display areas (e.g., the first surface 110A and the first areas 110D at the side). The second sensor module 106 may form the sensing area 110F in any portion of the screen display areas (e.g., the first surface 110A and the first areas 110D at the side). The second sensor module 106 may receive an input signal transmitted through the sensing area 110F and generate an electrical signal based on the received input signal. For example, the input signal may have a set physical quantity (e.g., heat, light, temperature, sound, pressure, ultrasound). For example, the input signal may include a signal related to biometric information (e.g., a fingerprint) of a user.

For example, the second sensor module 106 may include an optical fingerprint sensor for receiving light. For example, the second sensor module 106 may receive an optical signal that is emitted from a pixel included in the display 101, reflected by a fingerprint of a user's finger, and transmitted through the sensing area 110F.

For example, the second sensor module 106 may include an ultrasonic fingerprint sensor for transmitting and receiving ultrasonic waves. For example, the second sensor module 106 may include a transmission module that transmits an ultrasonic wave toward the fingerprint of the user's finger and a receiving module that receives the ultrasonic wave reflected by the finger and transmitted through the sensing area 110F.

In an embodiment, the camera area 110G may be at least partially overlapped with the screen display areas (e.g., the first surface 110A and the first areas 110D at the side). The camera area 110G may display content like other areas of the screen display areas (e.g., the first surface 110A and the first areas 110D at the side) and additionally be an area (e.g., a transmission area) through which an optical signal related to the first camera module 105 is transmitted. For example, the camera area 110G may display content like other areas of the screen display areas (e.g., the first surface 110A and the first areas 110D at the side) when the first camera module 105 is not operating. In an embodiment, the camera area 110G of the display 101 may be formed of the transmission area having a set transmittance. For example, the transmission area may be formed to have a transmittance in a range of approximately 20% to approximately 40%. The transmission area may include an area having a lower pixel density and/or wiring density than a surrounding area.

In an embodiment, any portion of the first camera module 105 may be disposed below the screen display areas (e.g., the first surface 110A and the first areas 110D at the side) and receive light passing through the camera area 110G. For example, light received by the first camera module 105 may include light reflected by or emitted from a subject. The first camera module 105 may generate an electrical signal related to the image based on the received light. The first camera module 105 may not be exposed as a surface (e.g., the front surface 110A) of the electronic device 100. For example, the first camera module 105 may be covered by content displayed in the camera area 110G. For example, an optical axis of a lens included in the first camera module 105 may be disposed to pass through the camera area 110G included in the display 101.

In an embodiment, the second camera module 112 may include a plurality of camera modules (e.g., a dual camera, a triple camera, or a quad camera). However, the second camera module 112 is not necessarily limited to including a plurality of camera modules and may include one camera module.

In an embodiment, the first camera module 105 and/or the second camera module 112 may include one or more lenses, an image sensor, and/or an image signal processor (ISP). A flash 113 may include, for example, an LED or a xenon lamp. In an embodiment, two or more lenses (e.g., an infrared camera, a wide-angle lens and a telephoto lens) and image sensors may be disposed in a housing such that one side (e.g., the second surface 110B) of the electronic device 100 faces a direction.

In an embodiment, sensor modules may generate an electrical signal or a data value corresponding to an internal operating state of the electronic device 100 or an external environmental state. In an example embodiment, a sensor module (not shown) may be disposed on any one of the first surface 110A, the second surface 110B, or the side surface 110C (e.g., the first areas 110D and/or the second areas 110E).

In various embodiments, the second sensor module 106 may include any one of a proximity sensor, an illuminance sensor, a time of flight (TOF) sensor, an ultrasonic sensor, a fingerprint recognition sensor, a gesture sensor, a gyro sensor, an atmospheric pressure sensor, a magnetic sensor, an acceleration sensor, a grip sensor, a color sensor, an infrared (IR) sensor, a biometric sensor, a temperature sensor, or a humidity sensor. In some example embodiments (not shown), the fingerprint sensor may be disposed on the second surface 110B.

The audio modules 103, 104, and 107 may include microphone holes 103 and 104 and a speaker hole 107.

In an embodiment, microphone holes 103 and 104 may include a first microphone hole 103 formed in a partial area of the side surface 110C and a second microphone hole 104 formed in a partial area of the second surface 110B. In the microphone holes 103 and 104, a microphone for obtaining an external sound may be disposed in the housing 110. The microphone may include a plurality of microphones to detect a sound direction. In an example embodiment, the second microphone hole 104 formed in the partial area of the second surface 110B may be disposed adjacent to the camera modules 105 and 112. For example, the second microphone hole 104 may obtain sound when the camera modules 105 and 112 are executed or obtain sound when other functions are executed.

In an embodiment, the speaker hole 107 may include a receiver hole (not shown) for a call. The speaker hole 107 may be formed in a portion of the side surface 110C of the electronic device 100. In an embodiment, the speaker hole 107 may be implemented as a single hole with the microphone hole 103. Although not illustrated in the drawings, the receiver hole (not shown) for a call may be formed in another portion of the side surface 110C. For example, the receiver hole (not shown) for a call may be formed in a portion (e.g., a portion facing a −Y-axis direction) of the side surface 110C in which the speaker hole 107 is formed and another portion (e.g., a portion facing a +Y-axis direction) of the side surface 110C facing the speaker hole 107.

In an embodiment, the electronic device 100 may include a speaker that is fluidly connected to the speaker hole 107 such that a fluid flows. In an embodiment, the speaker may include a piezo speaker in which the speaker hole 107 is omitted.

In an embodiment, the key input devices 117 may be disposed on the side surface 110C of the housing 110 (e.g., the first areas 110D and/or the second areas 110E). In an embodiment, the electronic device 100 may not include some or all of the key input devices 117, and the key input devices 117 that are not included may be implemented in other forms (e.g., soft keys on the display 101). In an embodiment, the key input devices 117 may include the second sensor module 106 forming the sensing area 110F included in the screen display areas (e.g., the first areas 110D and/or the second areas 110E).

In an embodiment, the connector hole 108 may receive a connector. The connector hole 108 may be disposed in the side surface 110C of the housing 110. For example, the connector hole 108 may be disposed in the side surface 110C to be adjacent to any portion of an audio module (e.g., the microphone hole 103 and the speaker hole 107). In an embodiment, the electronic device 100 may include the first connector hole that may accommodate a connector (e.g., a USB connector) for transmitting/receiving power and/or data to or from an external electronic device and/or an external electronic device, and may include a second connector hole (not shown) that may accommodate a connector (e.g., an earphone jack) for transmitting/receiving an audio signal to or from an external electronic device.

In an embodiment, the electronic device 100 may include an LED (not shown). For example, the LED (not shown) may be disposed on the first surface 110A of the housing 110. The LED (not shown) may provide state information of the electronic device 100 in a light form. In an embodiment, the LED (not shown) may provide a light source that is interlocked with the operation of the first camera module 105. For example, the LED (not shown) may include an LED, an IR LED, and/or a xenon lamp.

Figure 3:
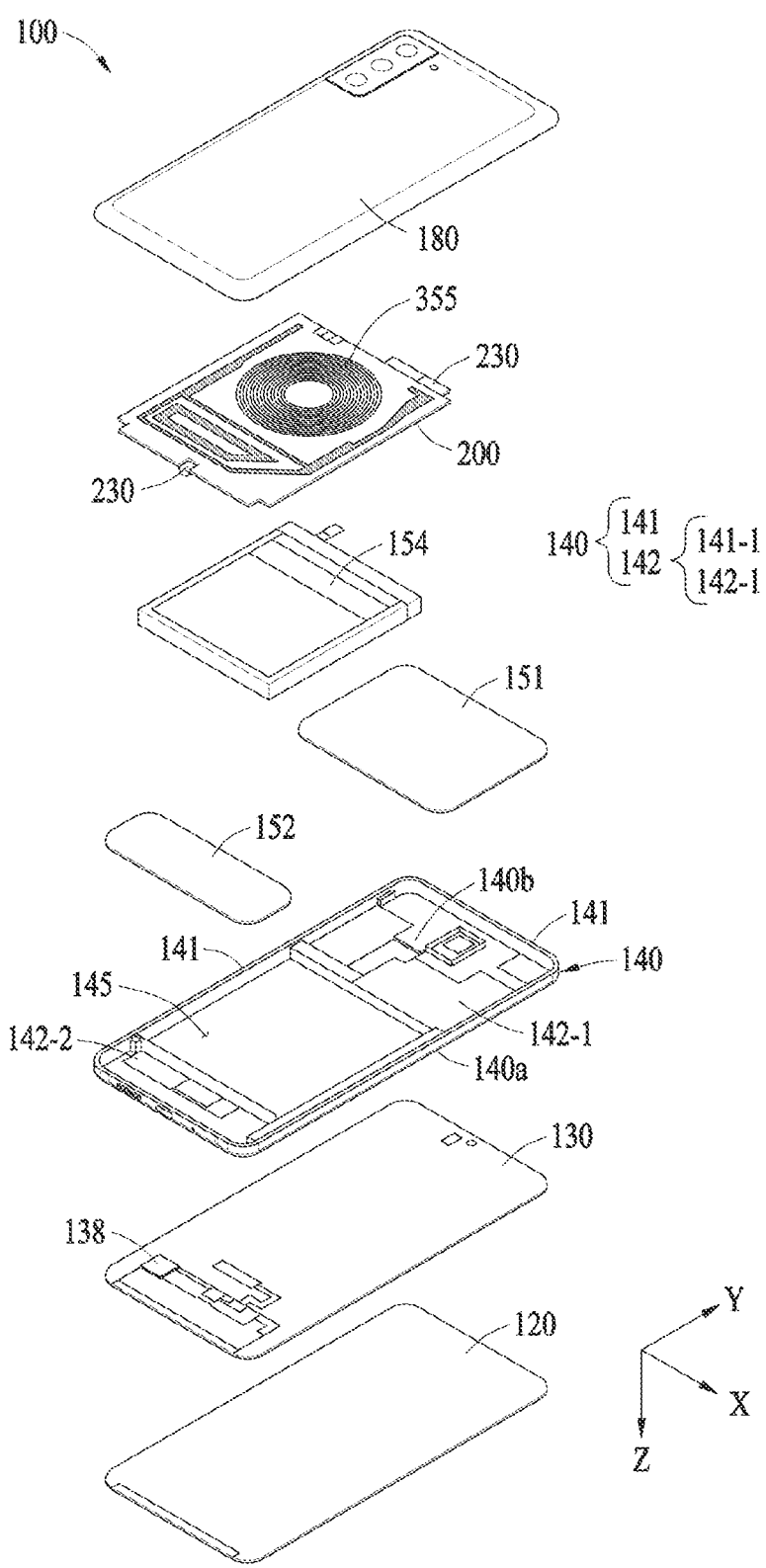
FIG. 3 is an exploded perspective view of the electronic device according to various embodiments.

FIG. 3 is an exploded perspective view of an electronic device according to various embodiments.

Referring to FIG. 3, the electronic device 100 may include the front plate 120 (e.g., the front plate 102 in FIG. 1), the display 130 (e.g., the display 101 in FIG. 1), a first support member 140 (e.g., a bracket), a first circuit board 200, a second circuit board 151, a third circuit board 152, a battery 154, and the rear plate 180 (e.g., the rear plate 111 in FIG. 2). In an embodiment, the electronic device 100 may omit any one of the components or may additionally include other components. Any one of the components of the electronic device 100 may be the same as or similar to any one of the components of the electronic device 100 illustrated in FIGS. 1 and 2. Thus, a repeated description thereof may not be repeated for brevity.

In various embodiments, the frame structure 141 of the front plate 120, the rear plate 180, and the first support member 140 may form a housing (e.g., the housing 110 in FIGS. 1 and 2). In various embodiments, the front plate 120 and the display 130 may be referred to as a display module. For example, the front plate 120 may include any one layer included in the display module.

In an embodiment, the support member 140 may include the frame structure 141 and a plate structure 142. In an embodiment, the frame structure 141 may be formed to surround an edge of the plate structure 142. For example, the frame structure 141 may form a portion of the housing (e.g., the housing 110 in FIG. 1). For example, the frame structure 141 may surround a space between the front plate 120 and the rear plate 180 and form a portion of a surface (e.g., a side surface) of the electronic device 100. For example, the frame structure 141 may be formed to connect edges of the front plate 120 and the rear plate 180, respectively. In an example embodiment, the plate structure 142 may be a structure in which various structures included in the electronic device are disposed. For example, the display 130, the first circuit board 200, the second circuit board 151, and the third circuit board 152 may be disposed on the plate structure 142.

In an embodiment, the plate structure 142 of the support member 140 may include a first surface 140a at least partially facing the display 130 and a second surface 140b at least partially facing the rear plate 180. For example, the first surface 140a may be a surface facing a +z axis direction, and the second surface 140b may be a surface facing a −z axis direction. In an embodiment, an opening 145 penetrating through the first surface 140a and the second surface 140b may be formed in the plate structure 142. In an embodiment, any portion of the display 130 may be positioned on the first surface 140a of the plate structure 142. In an example embodiment, any portion of each of the first circuit board 200, the second circuit board 151, and the third circuit board 152 may be positioned on the second surface 140b of the plate structure 142. In an embodiment, the battery 154 may be disposed in the opening 145 of the plate structure 142.

In an embodiment, the plate structure 142 may include a first portion 142-1 on one side of the opening 145 and a second portion 142-2 on the other side of the opening 145. For example, the first portion 142-1 may be positioned in a +y-axis direction based on the opening 145 and the second portion 142-2 may be positioned in a −y-axis direction based on the opening 145. For example, any portion of the second circuit board 151 may be disposed on the first portion 142-1. For example, any portion of the third circuit board 152 may be disposed on the second portion 142-2.

The battery 154, which is a device for supplying power to any one component of the electronic device 100, may include, for example, a non-rechargeable primary battery, a rechargeable secondary battery, or a fuel cell. In an example embodiment, the battery 154 may be disposed in the opening 145 of the plate structure 142.

In an example embodiment, from a top view of the first surface 140a of the plate structure 142, the battery 154 may be formed to have a size smaller than or substantially the same as the opening 145. For example, when the battery 154 is viewed in the +z-axis direction, the battery 154 may be formed so as not to overlap the support member 140. For example, in the +z-axis direction, the battery 154 may not be supported by each of the first portion 142-1, the second portion 142-2, and the frame structure 141 that are peripheral portions of the opening 145.

In an embodiment, from a top view of the second surface 140b of the plate structure 142, the battery 154 may be formed to have a size smaller than or substantially the same as the opening 145. For example, when the battery 154 is viewed in the −z-axis direction, the battery 154 may be formed so as not to overlap the support member 140. For example, in the −z-axis direction, the battery 154 may not be supported by each of the first portion 142-1, the second portion 142-2, and the frame structure 141 that are peripheral portions of the opening 145.

In an embodiment, the battery 154 may be attached to a surface of the first circuit board 200 facing the +z direction. For example, the battery 154 may be fixed in the opening 145 through the first circuit board 200.

In an embodiment, the first circuit board 200 may be disposed to at least partially cover the opening 145 of the plate structure 142. In an example embodiment, the first circuit board 200 may electrically connect the second circuit board 151 and the third circuit board 152 to each other. For example, a conductive pattern for electrically connecting the second circuit board 151 to the third circuit board 152 may be formed on the first circuit board 200.

In an embodiment, the first circuit board 200 may be formed to be at least partially greater than the opening 145 in the +z-axis or −z-axis direction. For example, the first circuit board 200 may be formed to be longer than the opening 145 in the y-axis direction and/or may be formed to be longer in an x-axis direction. For example, the first circuit board 200 may be coupled by any one of the first portion 142-1 and the second portion 142-2 that are peripheral portions of the frame structure 141 and/or the opening 145.

In an embodiment, a fixing bracket 230 may be coupled to an edge of the first circuit board 200. The fixing bracket 230 may be coupled to the first portion 142-1, the second portion 142-2, or the frame structure 141 of the plate structure 142. Thus, the first circuit board 200 may be fixedly coupled to the support member 140. For example, the fixing bracket 230 may be disposed on edges of the first circuit board 200 in the +y-axis/−y-axis direction, respectively.

In an embodiment, an antenna pattern 355 may be formed on the first circuit board 200. For example, the antenna pattern 355 may be formed on a surface of the first circuit board 200 facing the rear plate 180. An antenna pattern 355 may include, for example, a near field communication (NFC) antenna, a wireless charging antenna, and/or a magnetic secure transmission (MTS) antenna. The antenna pattern 355, for example, may perform short-range communication with an external device or wirelessly transmit/receive power needed for charging.

In an example embodiment, a processor, a memory, and/or an interface may be disposed on the second circuit board 151 and the third circuit board 152. The processor may include, for example, one or more of a central processing unit (CPU), an application processor (AP), a graphics processing unit (GPU), an ISP, a sensor hub processor, or a communication processor (CP). The interface may include, for example, a high-definition multimedia interface (HDMI), a universal serial bus (USB) interface, a secure digital (SD) card interface, or an audio interface. The interface may include, for example, a universal serial bus (USB) connector, a secure digital (SD) card/multimedia connect (MMC) connector, or an audio connector, to connect, electrically or physically, the electronic device 100 to an external electronic device.

The memory may include, for example, a volatile memory or a non-volatile memory.

Figure 4:
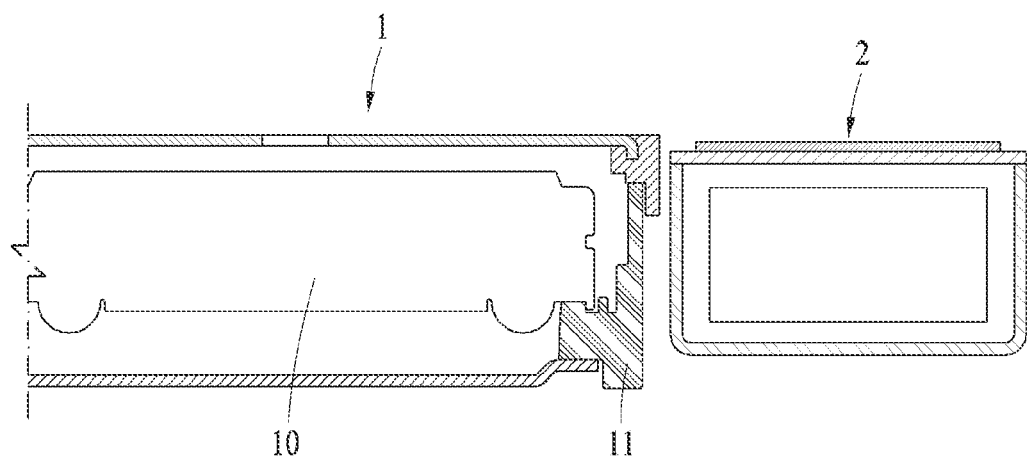
FIG. 4 is a cross-sectional view of a speaker module and a motor module according to a comparative example embodiment.

FIG. 4 is a cross-sectional view of a speaker module and a motor module according to a comparative example embodiment.

Referring to FIG. 4, a speaker module 1 and a motor module 2 may be provided in an electronic device, and the speaker module 1 may vibrate by a vibration force of the motor module 2 to output sound.

The speaker module 1 may be coupled to an inner portion of the electronic device to output sound through a sound output unit 10. The sound output unit 10 may include a radiation plate that vibrates by a vibration of the motor module 2, and the radiation plate may output sound externally through the vibration. An inner space of the speaker module 1 may be divided into a space on one side of the radiation plate and a space on the other side of the radiation plate based on the radiation plate as a starting point. A portion of sound waves generated by the radiation plate may propagate to the space on one side and the space on the other side of the radiation plate. For example, the sound waves generated by one surface of the radiation plate may be propagated to the space on one side of the radiation plate and transmitted outside of the electronic device. The sound waves generated by the other side of the radiation plate may propagate to the space on the other side of the radiation plate, and in such case, the space on the other side of the radiation plate may be used as a back volume.

Since the sound waves generated by each of the one side and the other side of the radiation plate are out of phase with each other, the sound waves generated on the one side and the other side of the radiation plate may interfere with each other in a narrow space, and thus a sound output quality by the speaker module 1 may be degraded. Thus, interference of sound waves generated by one side and the other side of the radiation plate may need to be prevented and/or reduced. To prevent and/or reduce the interference of sound waves, the space on one side and the space on the other side of the radiation plate may be completely separated. For example, a sound wave generated by one side of the radiation plate may move along inside of the electronic device through the space on one side of the radiation plate and output externally through a sound output opening. Other spaces including the space on the other side of the radiation plate may function as the space on one side of the radiation plate and a blocked back volume.

For sound output, the back volume may help to improve the sound quality of a low-frequency range. In other words, since the sound wave generated on one surface and the sound wave generated by the other surface are 180 degrees (°) out of phase with each other, the sound in a low-pitched range close to the original sound may not be easily output when destructive interference occurs. For example, when the sound wave generated by the other surface of the radiation plate is not blocked for the sound wave generated on one surface, the sound in a low range may be canceled and weakened. Thus, the sound mainly in a high range may be transmitted outside through the space on one surface of the radiation plate, and natural sound may not be reproduced easily.

In addition, in a process of the radiation plate vibrating, the radiation plate may compress the surrounding air, and the compressed ambient air may block a movement such that the radiation plate does not vibrate greatly. The back volume may help alleviate such a blockage phenomenon of the radiation plate by increasing a space surrounding the radiation plate and improving compliance of the air surrounding the radiation plate.

Thus, increasing an actual back volume for smooth sound output may be important based on the phenomenon described above. Similar to a typical speaker module 1 and the motor module 2, the speaker module 1 may be manufactured and installed separately from the motor module 2 such that an inner space of the speaker module 1 may have a structure blocking an inner space of the motor module 2. In addition, the speaker module 1 and the motor module 2 may have a structure completely separated by a member located in the middle, as illustrated in FIG. 2. The inner space of the speaker module 1 being used only as a back volume may output low-quality sound, and a member 11 between the speaker module 1 and the motor module 2 may be removed for widening an inner space of the electronic device. Although the actual back volume may be expanded, the actual back volume may not be substantially secured. Thus, the structure of the speaker module 1 and the motor module 2 may need to be changed to substantially expand the back volume.

In an embodiment, the electronic device may further include a sound processor (not shown) for processing a sound signal. In an example embodiment, a sound output module 300 may output a sound based on the sound signal of the sound processor (not shown). The sound output module 300 may include a sound output housing 310, a speaker unit 320, a motor unit 330, and a circuit board 340 (refer to FIG. 5) to effectively output high-quality sound.

Figure 5:
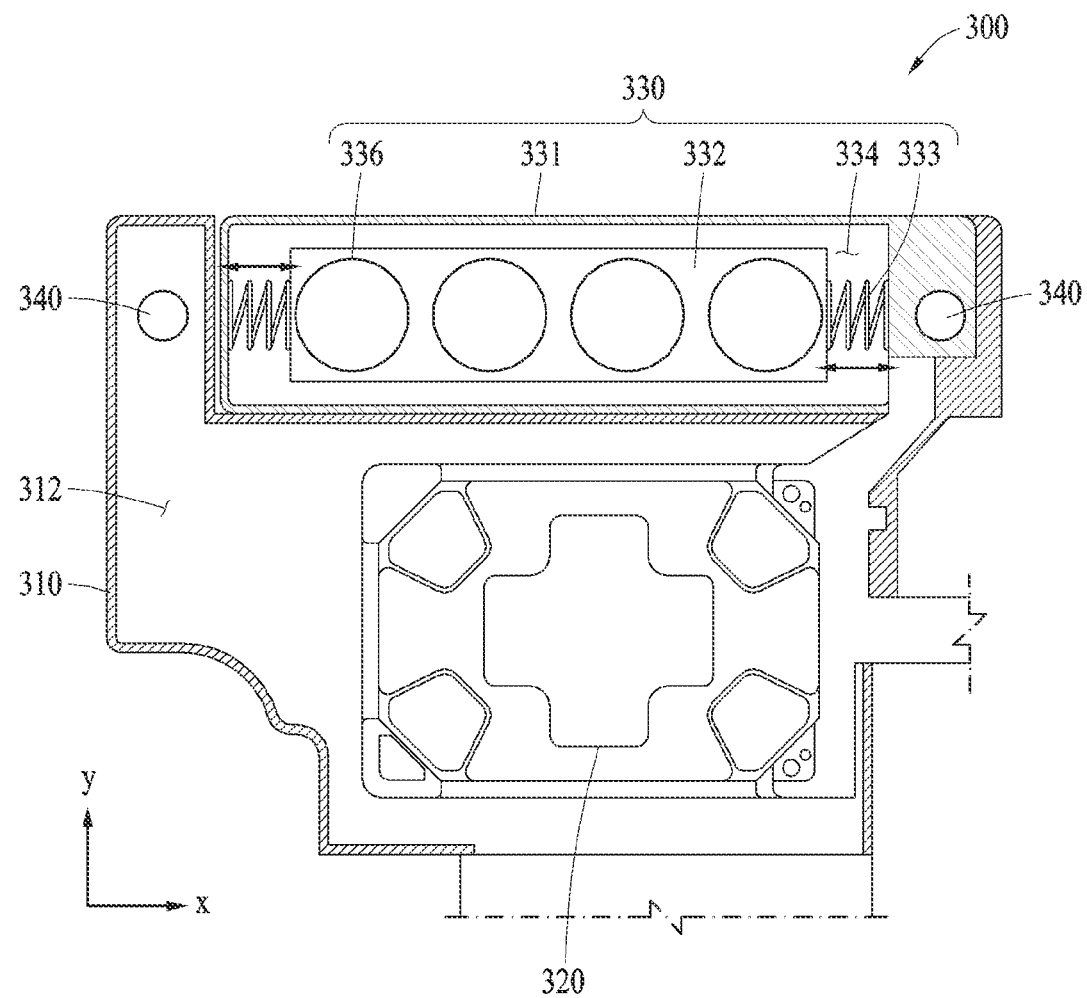
FIG. 5 is a cross-sectional view of a sound output module according to various embodiments.

FIG. 5 is a cross-sectional view illustrating a sound output module according to various embodiments.

Referring to FIG. 5, the speaker unit 320 and the motor unit 330 may be positioned in the sound output housing 310, and the motor unit 330 may be positioned above the speaker unit 320. In an embodiment, the speaker unit 320 may comprise a speaker, and the motor unit 330 may comprise a motor. The motor unit 330 may vibrate horizontally on both sides. A vibration force of the motor unit 330 may be transmitted to the circuit board 340 positioned on both sides of the motor unit 330. Operation information of the motor unit 330 received by the motor unit 330 may be transmitted to a sound processor (not shown) through the circuit board 340.

Figure 6:
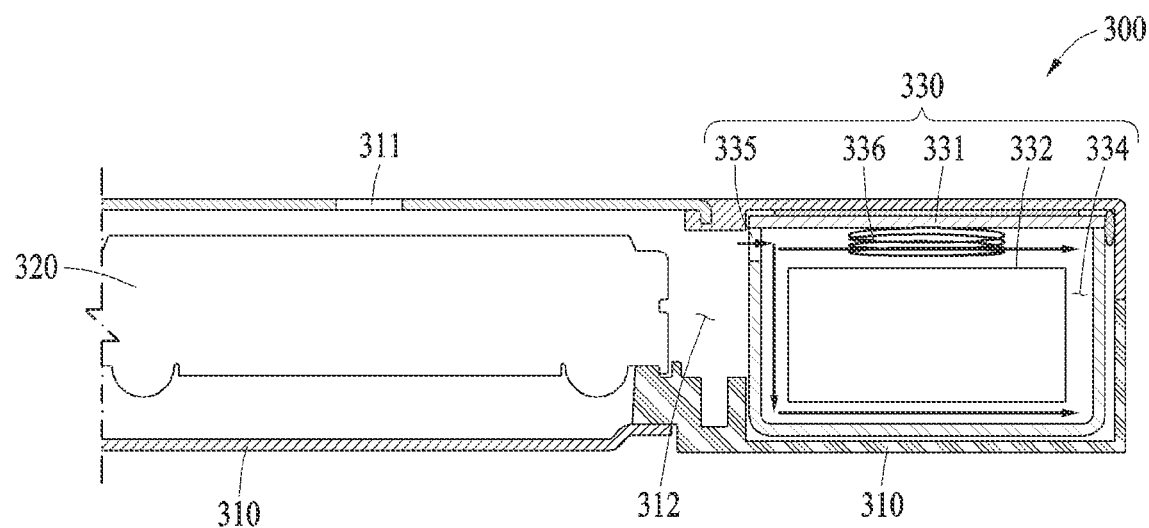
FIG. 6 is a cross-sectional view of a sound output module according to various embodiments.

FIG. 6 is a cross-sectional view illustrating a sound output module according to various embodiments.

Referring to FIG. 6, the sound output housing 310 may form an exterior of the sound output module 300. The sound output housing 310 may be positioned and fixed in an electronic device. The sound output housing 310 may accommodate the speaker unit 320 and the motor unit 330 by forming a space therein, which is to be described in greater detail below. The sound output housing 310 may block contact between external components and the speaker unit 320 and the motor unit 330 to prevent and/or reduce wear and tear and damage to the speaker unit 320 and the motor unit 330.

The sound output housing 310 may include an outer wall to which the speaker unit 320 is connected and an outer wall to which the motor unit 330 is connected. Each of the outer walls may be integrally formed with the other. Each of the outer walls may be connected to the other through a coupling method. The outer wall, to which the speaker unit 320 and the motor unit 330 are connected, is not limited to the structure illustrated in FIG. 6 and may be designed in various connection methods.

The speaker unit 320 may generate sound. For example, the speaker unit 320 may be positioned inside the sound output housing 310 and may generate sound by vibrating caused by a vibration force generated by the motor unit 330. For example, a sound output opening may be formed in an outer surface of the electronic device such that the sound output by the speaker unit 320 may be generated outside of the electronic device. When the speaker unit 320 is attached and connected to the rear surface of the sound output housing 310, a sound output from the inside of the speaker unit 320 may propagate outside through the sound output opening. To effectively output the sound outside, the speaker unit 320 may include a speaker body 321 (e.g., a speaker body in FIG. 7) and a diaphragm 322 (e.g., a diaphragm 322 in FIG. 7).

Figure 7:
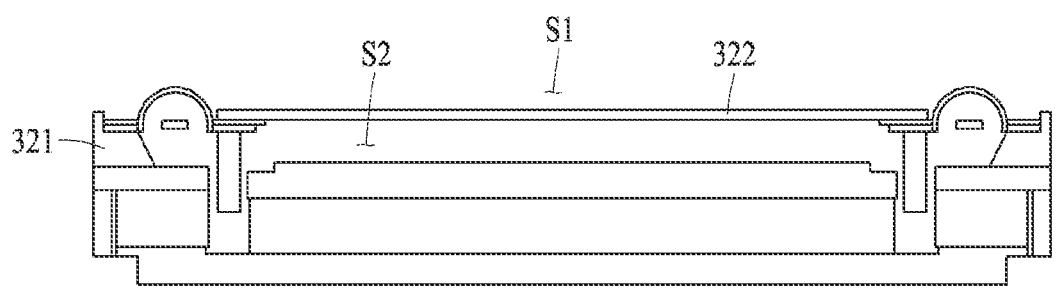
FIG. 7 is a cross-sectional view illustrating a speaker unit according to various embodiments.

FIG. 7 is a cross-sectional view illustrating a speaker unit according to various embodiments.

Referring to FIG. 7, the speaker body 321 may form a space therein to accommodate a diaphragm. In addition, the speaker body 321 may be connected to and fixed to an inner surface of the sound output housing 310. For example, the speaker body 321 may be connected to an inner rear surface of the sound output housing 310.

The diaphragm 322 may be positioned in the speaker body 321 and vibrate due to a vibration force of the motor unit 330. The diaphragm 322 may output sound by vibration of the diaphragm 322. Sound output by the diaphragm 322 may be radiated outside through a sound output opening formed in an outer surface of the electronic device.

The inner space of the speaker body 321 may be divided into a first space S1 and a second space S2 based on the diaphragm 322. That is, a space on one side of the diaphragm 322 may be the first space S1, and a space on the other side of the diaphragm 322 may be the second space S2 based on the diaphragm 322. That is, the first space S1 and the second space S1 may be blocked from each other by the diaphragm 322.

The first space S1 may communicate externally through the sound output opening formed in the outer surface of the electronic device. A sound output from one surface of the diaphragm 322, caused by the vibration, may pass through the first space S1 and propagate outside.

The sound output from the other surface of the diaphragm 322 may propagate to the second space S2. A phase of the sound output from the other surface of the diaphragm 322 may be different from the phase of the sound output from the one surface of the diaphragm 322. In other words, the phase of the sound output from the other surface of the diaphragm 322 and the phase of the sound output from the one surface of the diaphragm 322 may have a 180° phase difference.

The second space S2 may communicate with an inner portion of the electronic device. For example, regarding the sound output module 300, that is, when the sound output housing 310 is connected and a speaker body is connected to an inner surface of the sound output housing 310, an opening hole 311 penetrating through an exterior of the sound output housing 310 may be formed such that an inner space of the speaker body 321 and an inner portion of the electronic device communicate with each other.

In other words, the opening hole 311 formed through the inner surface of the sound output housing 310, to which the speaker body 321 is connected, may be formed. That is, the second space S2 in the speaker body 321 may communicate with the inner portion of the electronic device through the opening hole 311 of the sound output housing 310. In addition, the second space S2 may communicate with an inner space 312 of the sound output housing 310. Finally, the second space S2 to be described hereinafter may communicate with a volume space 334 in the motor body 331 through a communication hole 335 to be described hereinafter. Structural features in which the second space S2 and the volume space 334 communicate with each other in a portion of the motor unit 330 are described in greater detail below.

When the first space S1 and the second space S2 are completely separated by the diaphragm 322, the second space S2, the inner space 312 of the sound output housing 310, an inner space of the electronic device, and the volume space 334 may communicate with each other, and each space may act as a substantial back volume such that higher-quality sound may propagate outside. In other words, by securing more back volume space, sound output from one surface of the diaphragm 322 may not be interfered by sound output from the other surface of the diaphragm 322 in such structure, and the surrounding air may be compressed to alleviate movement of the diaphragm 322 from being suspended based on the vibration of the diaphragm 322.

The motor unit 330 may communicate with an inner space of the speaker unit 320 and generate a vibration force. For example, the motor unit 330 may generate a vibration force through electromagnetic induction and transmit the generated vibration force to the speaker unit 320 such that the diaphragm 322 vibrates. In addition, the motor unit 330 may perform a function of improving the quality of the sound output by the speaker unit 320 by forming the volume space 334 communicating with an inner space of the speaker unit 320 therein. The motor unit 330 may include the motor body 331, a vibration body 332, and an elastic member 333.

The motor body 331 may form a space to accommodate the vibration body 332, the elastic member 333, and an induction member 336. The motor body 331 may be connected and fixed to the inner surface of the sound output housing 310.

The motor body 331 may form the volume space 334 communicating with the inner space of the speaker unit 320. For example, the communication hole 335 penetrating through an outer wall of the motor body 331 may be formed. The volume space 334 inside the motor body 331 and the inner space of the speaker unit 320 may communicate with each other through the communication hole 335. For example, the second space S2 in the speaker body 321 may communicate with the inner space of the sound output housing 310, and the inner space 312 of the sound output housing 310 may communicate with the volume space 334 through the communication hole 335. Thus, the second space S2, the inner space of the sound output housing 310, and the volume space 334 may communicate with each other as one space, and the sound output from the other surface of the diaphragm 322 may propagate to the second space S2, the inner space of the sound output housing 310, and the volume space 334, and thus each space may perform a function of a substantial back volume. Thus, an inner portion of the motor body 331, that is, considering that the volume space 334 is not in a vacuum state and communicates with the outside of the motor body 331, the substantial back volume may be expanded inside of the motor body 331, and the quality of the sound output by the sound output module 300 may be further improved.

The vibration body 332 may be positioned in the motor body 331 to generate a vibration force. In other words, the vibration body 332 may be positioned in the volume space 334 to vibrate while being connected to the motor body 331 inside the motor body 331. For example, the motor unit 330 may further include the induction member 336 to vibrate the vibration body 332. The induction member 336 may include a coil. The induction member 336 may be connected in an inner portion of the motor body 331 and may generate a current while being spaced apart from the vibration body 332 at a predetermined interval. When electromagnetic induction occurs by the current generated by the induction member 336, the vibration body 332 of a metal material may vibrate.

The elastic member 333 may comprise an elastic material be positioned on both sides of the vibration body 332 to transmit the vibration force of the vibration body 332. For example, the elastic member 333 may be connected to the inner surface of the motor body 331 to connect the vibration body 332 and the motor body 331 to each other. The motor body 331 may include a vent hole formed through an outer surface of the motor body 331, and the vent hole may be positioned on both sides of the motor body 331. The elastic member 333 may be connected to the inner surface of the motor body 331 in which the vent hole is formed. Thus, the vibration force generated by the vibration body 332 may be transmitted to the outer portion of the motor body 331 through the vent hole along the elastic member 333. Thus, the vibration force generated by the vibration body 332 may be transmitted to the vibration plate of the speaker unit 320. Similar to the communication hole 335, the vent hole may be an opening hole that communicates with the volume space 334 and the inner space of the sound output housing 310.

A space in the motor body 331 excluding the vibration body 332, the induction member 336, and the elastic member 333 may become the volume space 334, thereby performing the function of the substantial back volume.

Referring to FIG. 5, a direction formed by the motor unit 330 and the speaker unit 320 may be parallel to the y-axis. In addition, the direction in which the motor unit 330 vibrates may be a direction parallel to the x-axis. In other words, a direction in which the vibration body 332 vibrates may be perpendicular to a direction from the motor unit 330 to the speaker unit 320. Thus, as illustrated in FIG. 5, the motor unit 330 may vibrate horizontally based on a front view.

The circuit board 340 may be connected to the elastic member 333 to receive an operation signal of the motor unit 330. The circuit board 340 may be connected to the elastic member 333 through the vent hole formed through the outer surface of the motor body 331, and a vibration motion generated by the vibration body 332 may be transmitted through the elastic member 333. Thus, the operation signal of the motor unit 330 may be received. In other words, the circuit board 340 may be positioned on both sides of the motor body 331 in which vent holes are formed. The operation signal of the speaker unit 320 and the motor unit 330, received by the circuit board 340, may be transmitted to the sound processor and may be used as information as a reference for a sound output operation of the sound output module 300. Thus, a structure of the sound output module 300 may be designed and manufactured more simply by receiving both operation signals of the speaker unit 320 and the motor unit 330 with only a single pair of circuit boards 340.

Hereinafter, an example embodiment in which each configuration of the sound output module is slightly modified is described, and prior to the description, a repeated description related thereto may not be repeated for brevity.

Figure 8:
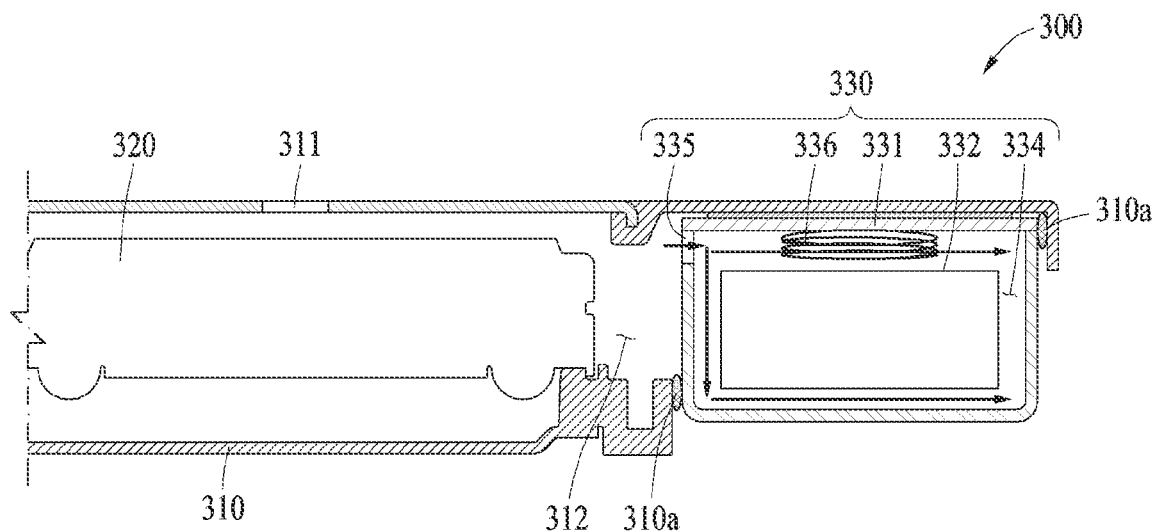
FIG. 8 is a cross-sectional view of a sound output module according to various embodiments.

FIG. 8 is a cross-sectional view illustrating a sound output module according to various embodiments.

Referring to FIG. 8, the speaker unit 320 and a motor unit of the sound output module may be connected to an inner portion of the sound output housing 310. That is, the sound output housing 310 may be connected to the motor body 331 in a form that surrounds a portion of the motor body 331 when the speaker unit 320 is accommodated in the sound output housing 310. In other words, only a portion of the motor body 331 may be fixedly connected to an inner surface of the sound output housing 310.

The motor body 331 may be fixed to the inner surface of the sound output housing 310 through a fixing member 310a. For example, the fixing member 310a may include a bonding material and may connect the motor body 331 and an inner side of the sound output housing 310 to each other using the bonding material. As illustrated in FIG. 8, when an upper surface of the motor body 331 is coupled to the inner side of the sound output housing 310 based on a side view of the sound output module, the fixing member 310a may be provided in plurality, occupy a relatively small area compared to an outer surface, and the motor body 331 and the sound output housing 310 may be connected to each other. In this case, the upper surface of the motor body 331 may be connected to the inner surface of the sound output housing 310 through an adhesive method in which an adhesive material is used. Based on such a structure, a connection relationship between the housing 310 and the motor body 331 may be simplified, and the volume of the sound output housing 310 may be reduced such that the sound output module is lightened and manufactured with a simpler structure. However, such a position and connection relationship of the fixing member 310a is only an example embodiment, and the fixing member 310a may have various types of positions and connection relationships.

Figure 9:
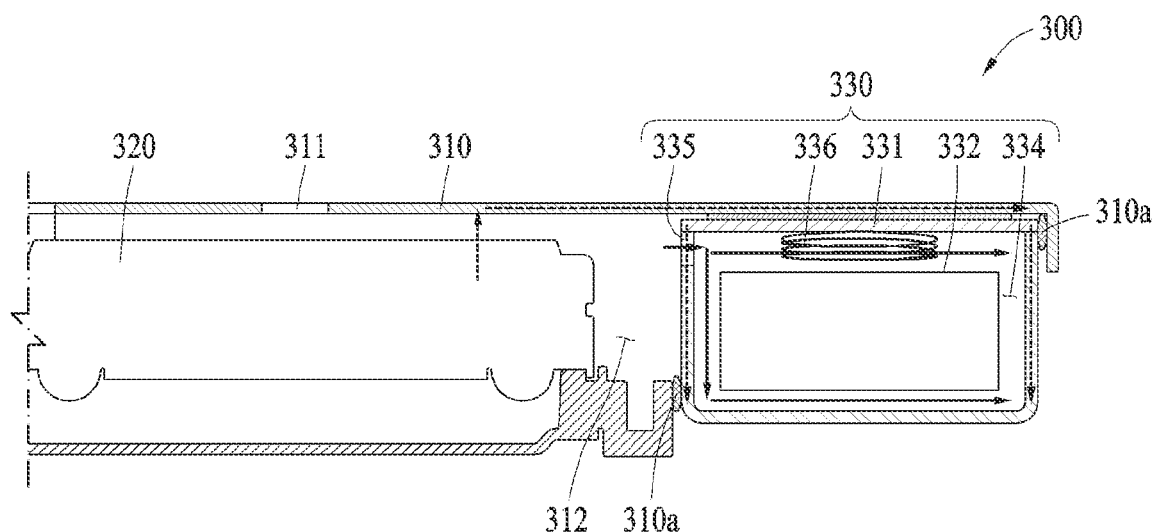
FIG. 9 is a cross-sectional view of a a sound output module according to various embodiments.

FIG. 9 is a cross-sectional view illustrating a sound output module according to various embodiments.

Referring to FIG. 9, the speaker unit 320 may be connected to one wall of the sound output housing 310 of the sound output module, and one wall of the sound output housing 310, to which the speaker unit 320 is connected, may extend toward the motor unit 330. The motor unit 330 may be connected to one wall of the sound output housing 310, to which the speaker unit 320 is connected. In other words, the speaker unit 320 and the motor unit 330 may be connected to one wall of the sound output housing 310 formed integrally as one body. Through one wall of the sound output housing 310, to which the speaker unit 320 and the motor unit 330 are connected, the heat generated by the speaker unit 320 may be radiated outside. Based on such structure, a sound output module may be manufactured with a simpler structure to reduce weight and manufacturing costs, and the heat generated inside by the speaker unit 320 may be more efficiently radiated outside.

Figure 10:
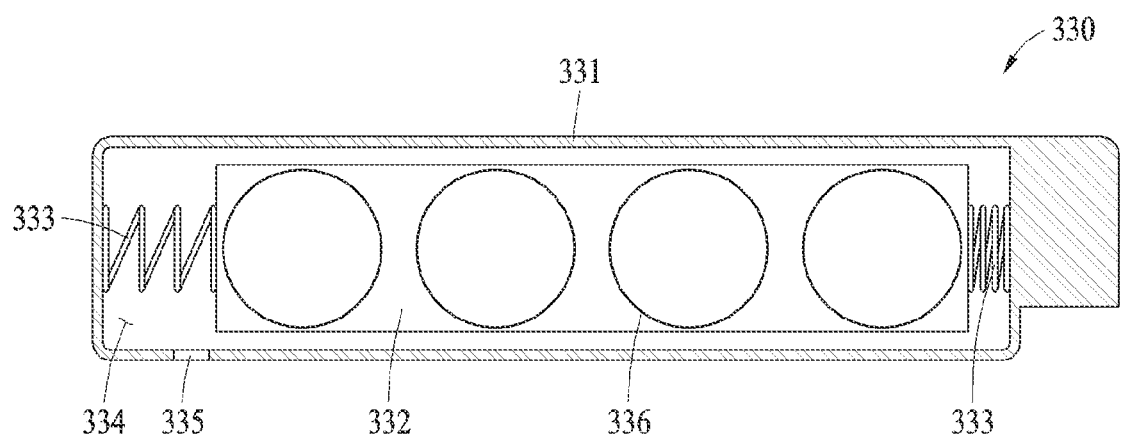
FIG. 10 is a cross-sectional view of a motor unit according to various embodiments.

FIG. 10 is a cross-sectional view illustrating a motor unit according to various embodiments.

Referring to FIG. 10, the motor unit 330 may include the motor body 331, the vibration body 332, the elastic member 333, and the induction member 336. The vibration body 332 may be connected to the elastic members 333 respectively on both sides of the vibration body 332, and each elastic member 333 may be connected to an inner surface of the motor body 331. The vibration body 332 may be positioned in the volume space 334 inside the motor body 331 and may lean to one side. For example, a length of the elastic member 333 on one side of the vibration body 332 may be shorter than a length of the elastic member 333 on the other side of the vibration body 332. For example, the vibration body 332 may be positioned more toward the elastic member 333 having a shorter length. The communication hole 335 that communicates with an inner space of a housing and the volume space 334 may be formed in an outer surface of the motor body 331 in which the elastic member 333 on one side having a relatively longer length is positioned. Based on such a structure, the motor unit 330 may maximize the volume space 334 directly connected to the communication hole 335. Thus, interference of sound output from the speaker unit 320 may be more effectively prevented and/or reduced and sound output quality in a process of using the volume space 334 as a substantial back volume through the communication hole 335 may be further improved.

Figure 11:
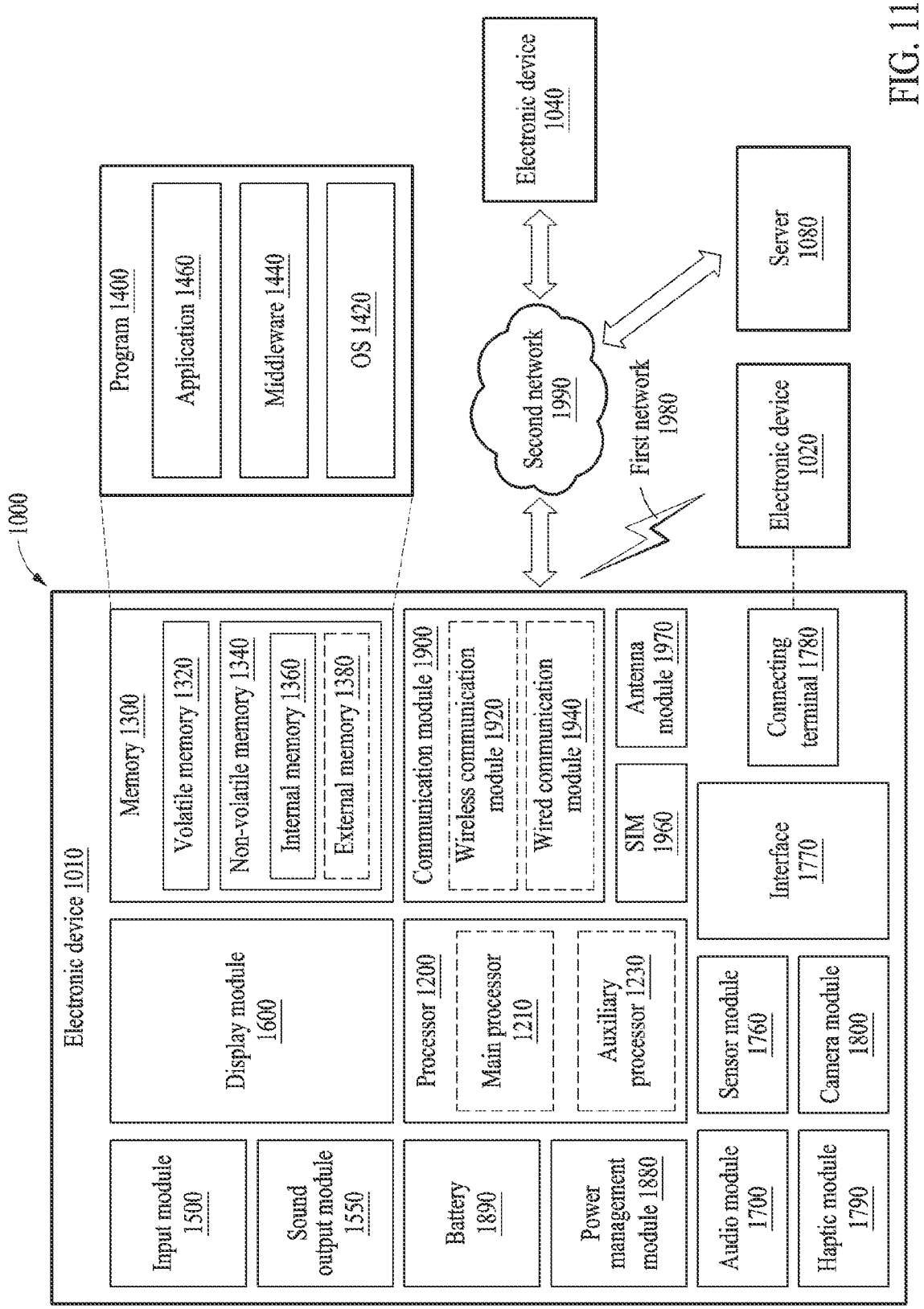
FIG. 11 is a block diagram illustrating an example electronic device in a network environment according to various embodiments.

FIG. 11 is a block diagram illustrating an electronic device 1010 in a network environment 1000 according to various example embodiments. Referring to FIG. 11, the electronic device 1010 in the network environment 1000 may communicate with an electronic device 1020 via a first network 1980 (e.g., a short-range wireless communication network), or communicate with at least one of an electronic device 1040 or a server 1080 via a second network 1990 (e.g., a long-range wireless communication network). According to an example embodiment, the electronic device 1010 may communicate with the electronic device 1040 via the server 1080. According to an example embodiment, the electronic device 1010 may include a processor 1200, a memory 1300, an input module 1500, a sound output module 1550, a display module 1600, an audio module 1700, and a sensor module 1760, an interface 1770, a connecting terminal 1780, a haptic module 1790, a camera module 1800, a power management module 1880, a battery 1890, a communication module 1900, a subscriber identification module (SIM) 1960, or an antenna module 1970. In some example embodiments, at least one (e.g., the connecting terminal 1780) of the above components may be omitted from the electronic device 1010, or one or more other components may be added in the electronic device 1010. In some example embodiments, some (e.g., the sensor module 1760, the camera module 1800, or the antenna module 1970) of the components may be integrated as a single component (e.g., the display module 1600).

The processor 1200 may execute, for example, software (e.g., a program 1400) to control at least one other component (e.g., a hardware or software component) of the electronic device 1010 connected to the processor 1200, and may perform various data processing or computation. According to an example embodiment, as at least a part of data processing or computation, the processor 1200 may store a command or data received from another component (e.g., the sensor module 1760 or the communication module 1900) in a volatile memory 1320, process the command or the data stored in the volatile memory 1320, and store resulting data in a non-volatile memory 1340. According to an example embodiment, the processor 1200 may include a main processor 1210 (e.g., a central processing unit (CPU) or an application processor (AP)) or an auxiliary processor 1230 (e.g., a graphics processing unit (GPU), a neural processing unit (NPU), an image signal processor (ISP), a sensor hub processor, or a communication processor (CP)) that is operable independently of, or in conjunction with the main processor 1210. For example, when the electronic device 1010 includes the main processor 1210 and the auxiliary processor 1230, the auxiliary processor 1230 may be adapted to consume less power than the main processor 1210 or to be specific to a specified function. The auxiliary processor 1230 may be implemented separately from the main processor 1210 or as a part of the main processor 1210.

The auxiliary processor 1230 may control at least some of functions or states related to at least one (e.g., the display module 1600, the sensor module 1760, or the communication module 1900) of the components of the electronic device 1010, instead of the main processor 1210 while the main processor 1210 is in an inactive (e.g., sleep) state or along with the main processor 1210 while the main processor 1210 is an active state (e.g., executing an application). According to an example embodiment, the auxiliary processor 1230 (e.g., an ISP or a CP) may be implemented as a portion of another component (e.g., the camera module 1800 or the communication module 1900) that is functionally related to the auxiliary processor 1230. According to an example embodiment, the auxiliary processor 1230 (e.g., an NPU) may include a hardware structure specified for artificial intelligence (AI) model processing. An AI model may be generated by machine learning. Such learning may be performed by, for example, the electronic device 1010 in which artificial intelligence is performed, or performed via a separate server (e.g., the server 1080). Learning algorithms may include, but are not limited to, for example, supervised learning, unsupervised learning, semi-supervised learning, or reinforcement learning. The AI model may include a plurality of artificial neural network layers. An artificial neural network may include, for example, a deep neural network (DNN), a convolutional neural network (CNN), a recurrent neural network (RNN), a restricted Boltzmann machine (RBM), a deep belief network (DBN), and a bidirectional recurrent deep neural network (BRDNN), a deep Q-network, or a combination of two or more thereof, but is not limited thereto. The AI model may additionally or alternatively include a software structure other than the hardware structure.

The memory 1300 may store various data used by at least one component (e.g., the processor 1200 or the sensor module 1760) of the electronic device 1010. The various data may include, for example, software (e.g., the program 1400) and input data or output data for a command related thereto. The memory 1300 may include the volatile memory 1320 or the non-volatile memory 1340.

The program 1400 may be stored as software in the memory 1300, and may include, for example, an operating system (OS) 1420, middleware 1440, or an application 146.

The input module 1500 may receive a command or data to be used by another component (e.g., the processor 1200) of the electronic device 1010, from the outside (e.g., a user) of the electronic device 1010. The input module 1500 may include, for example, a microphone, a mouse, a keyboard, a key (e.g., a button), or a digital pen (e.g., a stylus pen).

The sound output module 1550 may output a sound signal to the outside of the electronic device 1010. The sound output module 1550 may include, for example, a speaker or a receiver. The speaker may be used for general purposes, such as playing multimedia or playing record. The receiver may be used to receive an incoming call. According to an example embodiment, the receiver may be implemented separately from the speaker or as a part of the speaker.

The display module 1600 may visually provide information to the outside (e.g., a user) of the electronic device 1010. The display module 1600 may include, for example, a control circuit for controlling a display, a hologram device, or a projector and control circuitry to control a corresponding one of the display, the hologram device, and the projector. According to an example embodiment, the display device 1600 may include a touch sensor adapted to sense a touch, or a pressure sensor adapted to measure an intensity of a force incurred by the touch.

The audio module 1700 may convert a sound into an electric signal or vice versa. According to an example embodiment, the audio module 1700 may obtain the sound via the input module 1500 or output the sound via the sound output module 1550 or an external electronic device (e.g., an electronic device 1020 such as a speaker or a headphone) directly or wirelessly connected to the electronic device 1010.

The sensor module 1760 may detect an operational state (e.g., power or temperature) of the electronic device 1010 or an environmental state (e.g., a state of a user) external to the electronic device 1010, and generate an electric signal or data value corresponding to the detected state. According to an example embodiment, the sensor module 1760 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 1770 may support one or more specified protocols to be used for the electronic device 1010 to be coupled with the external electronic device (e.g., the electronic device 1020) directly (e.g., wiredly) or wirelessly. According to an example embodiment, the interface 1770 may include, for example, a high-definition multimedia interface (HDMI), a universal serial bus (USB) interface, a secure digital (SD) card interface, or an audio interface.

The connecting terminal 1780 may include a connector via which the electronic device 1010 may be physically connected to an external electronic device (e.g., the electronic device 1020). According to an example embodiment, the connecting terminal 1780 may include, for example, an HDMI connector, a USB connector, an SD card connector, or an audio connector (e.g., a headphone connector).

The haptic module 1790 may convert an electric signal into a mechanical stimulus (e.g., a vibration or a movement) or an electrical stimulus which may be recognized by a user via his or her tactile sensation or kinesthetic sensation. According to an example embodiment, the haptic module 1790 may include, for example, a motor, a piezoelectric element, or an electric stimulator.

The camera module 1800 may capture a still image and moving images. According to an example embodiment, the camera module 1800 may include one or more lenses, image sensors, ISPs, or flashes.

The power management module 1880 may manage power supplied to the electronic device 1010. According to an example embodiment, the power management module 1880 may be implemented as, for example, at least a part of a power management integrated circuit (PMIC).

The battery 1890 may supply power to at least one component of the electronic device 1010. According to an example embodiment, the battery 1890 may include, for example, a primary cell which is not rechargeable, a secondary cell which is rechargeable, or a fuel cell.

The communication module 1900 may support establishing a direct (e.g., wired) communication channel or a wireless communication channel between the electronic device 1010 and the external electronic device (e.g., the electronic device 1020, the electronic device 1040, or the server 1080) and performing communication via the established communication channel. The communication module 1900 may include one or more communication processors that are operable independently of the processor 1200 (e.g., an AP) and that support a direct (e.g., wired) communication or a wireless communication. According to an example embodiment, the communication module 1900 may include a wireless communication module 1920 (e.g., a cellular communication module, a short-range wireless communication module, or a global navigation satellite system (GNSS) communication module) or a wired communication module 194 (e.g., a local area network (LAN) communication module, or a power line communication (PLC) module). A corresponding one of these communication modules may communicate with the external electronic device 1040 via the first network 1980 (e.g., a short-range communication network, such as Bluetooth™, wireless-fidelity (Wi-Fi) direct, or infrared data association (IrDA)) or the second network 1990 (e.g., a long-range communication network, such as a legacy cellular network, a 5G network, a next-generation communication network, the Internet, or a computer network (e.g., a LAN or a wide area network (WAN))). These various types of communication modules may be implemented as a single component (e.g., a single chip), or may be implemented as multi components (e.g., multi chips) separate from each other. The wireless communication module 1920 may identify and authenticate the electronic device 1010 in a communication network, such as the first network 1980 or the second network 1990, using subscriber information (e.g., international mobile subscriber identity (IMSI)) stored in the SIM 1960.

The wireless communication module 1920 may support a 5G network after a 4G network, and a next-generation communication technology, e.g., a new radio (NR) access technology. The NR access technology may support enhanced mobile broadband (eMBB), massive machine type communications (mMTC), or ultra-reliable and low-latency communications (URLLC). The wireless communication module 1920 may support a high-frequency band (e.g., a mmWave band) to achieve, e.g., a high data transmission rate. The wireless communication module 1920 may support various technologies for securing performance on a high-frequency band, such as, e.g., beamforming, massive multiple-input and multiple-output (MIMO), full dimensional MIMO (FD-MIMO), an array antenna, analog beam-forming, or a large scale antenna. The wireless communication module 1920 may support various requirements specified in the electronic device 1010, an external electronic device (e.g., the electronic device 1040), or a network system (e.g., the second network 1990). According to an example embodiment, the wireless communication module 1920 may support a peak data rate (e.g., 20 Gbps or more) for implementing eMBB, loss coverage (e.g., 164 dB or less) for implementing mMTC, or U-plane latency (e.g., 0.5 ms or less for each of downlink (DL) and uplink (UL), or a round trip of 1 ms or less) for implementing URLLC.

The antenna module 1970 may transmit or receive a signal or power to or from the outside (e.g., the external electronic device) of the electronic device 1010. According to an example embodiment, the antenna module 1970 may include an antenna including a radiating element including a conductive material or a conductive pattern formed in or on a substrate (e.g., a printed circuit board (PCB)). According to an example embodiment, the antenna module 1970 may include a plurality of antennas (e.g., array antennas). In such a case, at least one antenna appropriate for a communication scheme used in a communication network, such as the first network 1980 or the second network 1990, may be selected by, for example, the communication module 1900 from the plurality of antennas. The signal or the power may be transmitted or received between the communication module 1900 and the external electronic device via the at least one selected antenna. According to an example embodiment, another component (e.g., a radio frequency integrated circuit (RFIC)) other than the radiating element may be additionally formed as a part of the antenna module 1970.

According to various example embodiments, the antenna module 1970 may form a mmWave antenna module. According to an example embodiment, the mmWave antenna module may include a PCB, an RFIC disposed on a first surface (e.g., a bottom surface) of the PCB or adjacent to the first surface and capable of supporting a designated a high-frequency band (e.g., the mmWave band), and a plurality of antennas (e.g., array antennas) disposed on a second surface (e.g., a top or a side surface) of the PCB, or adjacent to the second surface and capable of transmitting or receiving signals in the designated high-frequency band.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an example embodiment, commands or data may be transmitted or received between the electronic device 1010 and the external electronic device 1040 via the server 1080 coupled with the second network 1990. Each of the external electronic devices 1020 and 1040 may be a device of the same type as or a different type from the electronic device 1010. According to an example embodiment, all or some of operations to be executed by the electronic device 1010 may be executed at one or more of the external electronic devices 1020, 1040, and 1080. For example, if the electronic device 1010 needs to perform a function or a service automatically, or in response to a request from a user or another device, the electronic device 1010, instead of, or in addition to, executing the function or the service, may request one or more external electronic devices to perform at least part of the function or the service. The one or more external electronic devices receiving the request may perform the at least part of the function or the service requested, or an additional function or an additional service related to the request, and may transfer an outcome of the performing to the electronic device 1010. The electronic device 1010 may provide the outcome, with or without further processing of the outcome, as at least part of a reply to the request. To that end, a cloud computing, distributed computing, mobile edge computing (MEC), or client-server computing technology may be used, for example. The electronic device 1010 may provide ultra low-latency services using, e.g., distributed computing or mobile edge computing. In another example embodiment, the external electronic device 1040 may include an Internet-of-things (IoT) device. The server 1080 may be an intelligent server using machine learning and/or a neural network. According to an example embodiment, the external electronic device 1040 or the server 1080 may be included in the second network 1990. The electronic device 1010 may be applied to intelligent services (e.g., smart home, smart city, smart car, or healthcare) based on 5G communication technology or IoT-related technology.

The electronic device according to various embodiments may be one of various types of electronic devices. The electronic device may include, for example, a portable communication device (e.g., a smartphone), a computer device, a portable multimedia device, a portable medical device, a camera, a wearable device, a home appliance device, or the like. According to an embodiment, the electronic device is not limited to those described above.

It should be understood that various embodiments of the present disclosure and the terms used therein are not intended to limit the technological features set forth herein to particular embodiments and include various changes, equivalents, or replacements for a corresponding embodiment. In connection with the description of the drawings, like reference numerals may be used for similar or related components. It is to be understood that a singular form of a noun corresponding to an item may include one or more of the things, unless the relevant context clearly indicates otherwise. As used herein, "A or B", "at least one of A and B", "at least one of A or B", "A, B or C", "at least one of A, B and C", and "A, B, or C," each of which may include any one of the items listed together in the corresponding one of the phrases, or all possible combinations thereof. Terms such as "first", "second", or "first" or "second" may simply be used to distinguish the component from other components in question, and may refer to components in other aspects (e.g., importance or order) is not limited. It is to be understood that if an element (e.g., a first element) is referred to, with or without the term "operatively" or "communicatively", as "coupled with," "coupled to," "connected with," or "connected to" another element (e.g., a second element), the element may be coupled with the other element directly (e.g., wiredly), wirelessly, or via a third element.

As used in connection with various example embodiments of the disclosure, the term "module" may include a unit implemented in hardware, software, firmware, or any combination thereof, and may interchangeably be used with other terms, for example, "logic," "logic block," "part," or "circuitry". A module may be a single integral component, or a minimum unit or part thereof, adapted to perform one or more functions. For example, according to an example embodiment, the module may be implemented in a form of an application-specific integrated circuit (ASIC).

According to various example embodiments, an electronic device includes a sound processor configured to process a sound signal and a sound output module configured to output sound based on the sound signal of the sound processor. The sound output module may include a sound output housing, a speaker unit including a speaker positioned in the sound output housing configured to generate sound, and a motor unit comprising a motor configured to communicate with an inner space of the speaker unit to generate a vibration force. The motor unit may include a motor body forming a volume space in communication with the inner space of the speaker unit and a vibration body positioned in the motor body configured to generate a vibration force. A communication hole may be formed in an outer wall of the motor body for the inner space of the speaker unit and the volume space to communicate with each other.

According to an example embodiment, the speaker unit may include a speaker body connected to an inner surface of the sound output housing and a diaphragm configured to vibrate by the vibration force of the motor unit and positioned in the speaker body.

According to an example embodiment, an inner space of the speaker body may be divided into a first space and a second space by the diaphragm.

According to an example embodiment, the second space may be configured to communicate with the volume space through the communication hole.

According to an example embodiment, the electronic device comprise a sound output opening formed in an outer surface of the electronic device such that the sound output by the speaker unit is generated outside of the electronic device According to an example embodiment, a sound output from one surface of the diaphragm propagate to the first space, and a sound output from the other surface of the diaphragm propagate to the second space, and a phase of the sound output from the other surface of the diaphragm has a 180° phase difference from a phase of the sound output from the one surface of the diaphragm. According to an example embodiment, the first space and the second space may be blocked from each other by the diaphragm.

According to an example embodiment, the motor unit may further include an elastic member comprising an elastic material positioned on both sides of the vibration body to transmit the vibration force of the vibration body.

According to an example embodiment, the elastic member is connected to an inner surface of the motor body to connect the vibration body and the motor body to each other.

According to an example embodiment, a vibration direction of the vibration body may be perpendicular to a direction from the motor unit toward the speaker unit.

According to an example embodiment, the sound output module may further include a circuit board configured to receive an operation signal of the speaker unit. The circuit board may be connected to the elastic member and configured to receive an operation signal of the motor unit.

According to an example embodiment, the motor body may include a vent hole formed through the outer surface. The circuit board may be connected to the elastic member through the communication hole.

According to an example embodiment, the speaker unit may be connected to one wall of the sound output housing. The one wall of the sound output housing connected to the speaker unit extends toward the motor unit.

According to an example embodiment, the motor unit may be connected to the one wall of the sound output housing to which the speaker unit is connected.

According to an example embodiment, the sound output housing may be configured to radiate heat generated by the speaker unit through the one wall of the sound output housing to which the speaker unit and the motor unit are connected.

According to various example embodiments, a sound output module for an electronic device includes a sound output housing, a speaker unit comprising a speaker positioned in the sound output housing configured to generate a sound, and a motor unit comprising a motor configured to communicate with an inner space of the speaker unit configured to generate a vibration force. The motor unit may include a motor body forming a volume space in communication with the inner space of the speaker unit and a vibration body positioned in the motor body and configured to generate a vibration force. A communication hole may be formed in an outer wall of the motor body configured so that the inner space of the speaker unit and the volume space to communicate with each other.

According to an example embodiment, the speaker unit may include a speaker body connected to an inner surface of the sound output housing and a diaphragm configured to vibrate by the vibration force of the motor unit and positioned in the speaker body.

According to an example embodiment, an inner space of the speaker body may be divided into a first space and a second space by the diaphragm.

While the disclosure has been illustrated and described with reference to various example embodiments, it will be understood that the various example embodiments are intended to be illustrative, not limiting. It will be further understood by those skilled in the art that various changes in form and detail may be made without departing from the true spirit and full scope of the disclosure, including the appended claims and their equivalents. It will also be understood that any of the embodiment(s) described herein may be used in conjunction with any other embodiment(s) described herein.

What is claimed is:

1. An electronic device comprising:
   a sound processor configured to process a sound signal;
   a sound output module configured to output sound based on the processed sound signal and comprising:
   a sound output housing, and
   a speaker unit comprising a speaker positioned in the sound output housing and configured to generate sound, and
   a motor unit comprising:
   a motor configured to generate a vibration force,
   a motor body forming a volume space, and
   a vibration body positioned in the motor body and coupled to the motor, wherein the volume space communicates with an inner space of the speaker unit via a communication hole formed in an outer wall of the motor body.

2. The electronic device of claim 1, wherein the speaker unit comprises:
   a speaker body connected to an inner surface of the sound output housing; and
   a diaphragm configured to vibrate by the vibration force of the motor unit and positioned in the speaker body.

3. The electronic device of claim 2, wherein an inner space of the speaker body is divided into a first space and a second space by the diaphragm.

4. The electronic device of claim 3, wherein the second space is configured to communicate with the volume space through the communication hole.

5. The electronic device of claim 4, wherein the electronic device comprise a sound output opening formed in an outer surface of the electronic device such that the sound output by the speaker unit is generated outside of the electronic device.

6. The electronic device of claim 5, wherein a sound output from one surface of the diaphragm propagate to the first space, and a sound output from the other surface of the diaphragm propagate to the second space, and
   wherein a phase of the sound output from the other surface of the diaphragm has a 180° phase difference from a phase of the sound output from the one surface of the diaphragm.

7. The electronic device of claim 6, wherein the first space and the second space are blocked from each other by the diaphragm.

8. The electronic device of claim 1, wherein the motor unit further comprises an elastic member comprising an elastic material positioned on both sides of the vibration body to transmit the vibration force of the vibration body.

9. The electronic device of claim 8, wherein the elastic member is connected to an inner surface of the motor body to connect the vibration body and the motor body to each other.

10. The electronic device of claim 8, wherein a vibration direction of the vibration body is perpendicular to a direction from the motor unit toward the speaker unit.

11. The electronic device of claim 8, wherein the sound output module further comprises a circuit board configured to receive an operation signal of the speaker unit, and
wherein the circuit board is connected to the elastic member and configured to receive an operation signal of the motor unit.

12. The electronic device of claim 11, wherein the motor body comprises a vent hole formed through the outer surface, and
wherein the circuit board is connected to the elastic member through the communication hole.

13. The electronic device of claim 1, wherein the speaker unit is connected to one wall of the sound output housing, and
wherein the one wall of the sound output housing connected to the speaker unit extends toward the motor unit.

14. The electronic device of claim 13, wherein the motor unit is connected to the one wall of the sound output housing to which the speaker unit is connected.

15. The electronic device of claim 14, wherein the sound output housing is configured to radiate heat generated by the speaker unit through the one wall of the sound output housing to which the speaker unit and the motor unit are connected.

16. A sound output module for an electronic device comprising:
a sound output housing;
a speaker unit comprising a speaker positioned in the sound output housing and configured to generate a sound; and
a motor unit comprising a motor configured to communicate with an inner space of the speaker unit and configured to generate a vibration force,
wherein the motor unit comprises a motor body forming a volume space in communication with the inner space of the speaker unit and a vibration body positioned in the motor body and configured to generate a vibration force, and
wherein a communication hole is formed in an outer wall of the motor body for the inner space of the speaker unit and the volume space to communicate with each other.

17. The sound output module of claim 16, wherein the speaker unit comprises:
a speaker body connected to an inner surface of the sound output housing; and
a diaphragm configured to vibrate by the vibration force of the motor unit and positioned in the speaker body,
wherein an inner space of the speaker body is divided into a first space and a second space by the diaphragm.

18. The sound output module of claim 17, wherein the second space is configured to communicate with the volume space through the communication hole.

19. The sound output module of claim 16, wherein the motor unit further comprises an elastic member comprising an elastic material positioned on both sides of the vibration body and configured to transmit the vibration force of the vibration body, and
wherein the motor unit is positioned above or below the speaker unit and the vibration body is configured to vibrate to both sides, based on a front view.

20. The sound output module of claim 16, wherein one wall of the sound output housing connected to the speaker unit extends towards the motor unit and the one wall of the sound output housing is connected to the motor unit.

* * * * *